H. STAHL.
CHAIN WHEEL.
APPLICATION FILED MAR. 31, 1921.

1,412,068.

Patented Apr. 11, 1922.

INVENTOR:

UNITED STATES PATENT OFFICE.

HUGO STAHL, OF STUTTGART, GERMANY, ASSIGNOR TO FREDERICK W. BUSE, OF PITTSBURGH, PENNSYLVANIA.

CHAIN WHEEL.

1,412,068.  Specification of Letters Patent.  Patented Apr. 11, 1922.

Application filed March 31, 1921. Serial No. 457,434.

*To all whom it may concern:*

Be it known that I, HUGO STAHL, a citizen of the German Empire, residing at Stuttgart, Germany, have invented certain new and useful Improvements in Chain Wheels, of which the following is a specification.

My invention refers to chain wheels or sheaves and its particular object is a chain wheel or the like, made of sheet metal and which is simpler and cheaper than the ordinary cast metal wheels.

Up till now chain wheels or the like for use with link chains have been made by casting the teeth in the groove designed to take up the chain. The teeth produced in this manner, are not always sufficiently even and the chain wheels frequently become too heavy for their purpose, when for instance employed as hand wheels for pulley blocks and the like.

According to the present invention, now, I produce chain wheels that are not only much lighter, but also far more accurate than cast chain wheels, this being achieved by a process of manufacture which is especially suitable for manufacture on a large scale, besides allowing of manufacturing the wheel at a much lower cost than a chain wheel of the old type.

The chain wheel according to my invention is built up of two sheet-metal discs which are provided with teeth in the shape of bosses produced preferably by stamping.

In the drawings affixed to this specification and forming part thereof a chain wheel embodying my invention is illustrated by way of example. In the drawings—

Figure 1:
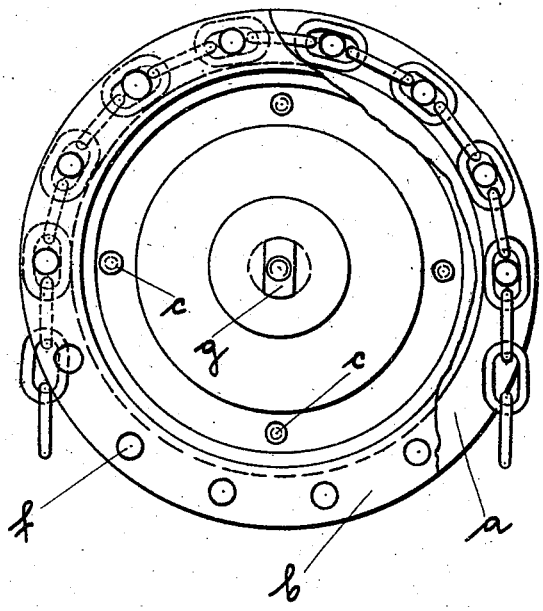
Fig. 1 is a side elevation of the new chain wheel with one of the sheet-metal discs partially removed.
Figure 2:
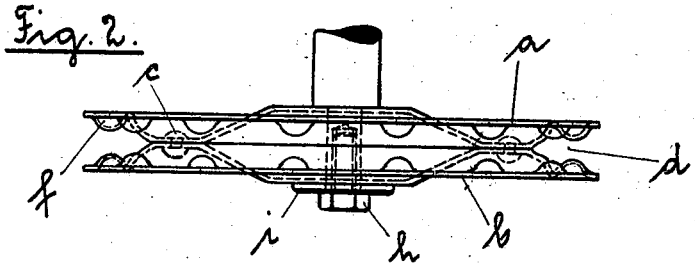
Fig. 2 is a plan of Fig. 1, whilst
Figure 3:
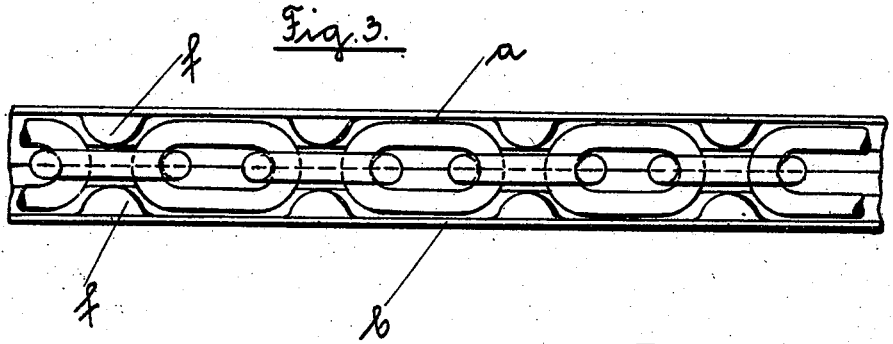
Fig. 3 is an evolution of the chain and the chain groove of the wheel corresponding to the plan in Fig. 2, drawn to a larger scale.

Referring to the drawings the chain wheel is formed of two circular sheet metal discs $a$ and $b$ each, say, 2 mms. thick. These discs are first stamped in a hot state so as to have a cross-section comprising a groove $d$ around the circumference of the wheel on the discs being joined to one another in the manner shown in the drawing (say, by means of rivets $c$), whilst the hub portions of the discs are distanced so far apart as to ensure for the wheel a reliable seat on the shaft.

The groove $d$ is provided with stamped bosses $f$ arranged at intervals around the periphery and projecting into the interior of the groove, these bosses serving as teeth. In connecting the two discs $a$ and $b$ with one another so as to form a wheel or sheave, the two discs are placed against one another in such a way as to bring each boss of the one disc opposite one on the other disc.

The stamped bosses may have a spherical shape as in the case of the example illustrated in the drawings. There may, however, also be used bosses of any other suitable shape, such as, for instance, oblong bosses extending in a radial direction. It is obvious, however, that the shape and position of the bosses serving as teeth must be chosen so that it does not give rise to trouble in the working of the chain by causing the chain to catch on the bosses or to lie upon them.

The teeth or bosses $f$ can of course be produced simultaneously with the stamping of the discs.

Instead of joining the two discs $a$ and $b$ together in the manner illustrated in the drawing, they may as well be fastened together in a very simple manner by electric welding.

If the chain wheel is to be fitted on a shaft or the like, in a manner preventing the wheel from rotating on the latter, it is recommended to provide the hub of at least one of the two discs with a corresponding indenture that engages with a suitable key or driver.

In the case illustrated in the drawing, the shaft or journal is flattened out at the point of connection with the chain wheel, the discs of the latter being provided with corresponding indentures $g$ (Fig. 1).

If the journal carrying the chain wheel, is made somewhat shorter than the width of the wheel at the hub, the wheel can be compressed with a certain (small) amount of elasticity by means of an axial set screw $h$ and a washer $i$, thus simultaneously utilizing the elasticity of the chain wheel for locking the screw $h$. The angular opening $g$ in the chain wheel may further be replaced by a circular hole in one or both of the discs or by a hole arranged eccentrically and engaging with a catch pin fitted on the shaft or on a pulley, or ring, or the like, on the shaft.

It is obvious that the new chain wheel requires far less metal than a cast iron wheel whilst still having the same strength, and that a saving is therefore effected in this respect also. Another important advantage resides in the fact that all finishing work can be dispensed with the wheels being manufactured in a small number of operations succeeding one another in rapid succession and requiring but comparatively few and simple manufacturing appliances.

My invention is particularly suitable for hand chain wheels, but other chain wheels, and more especially large ones can also be produced in accordance with it. If necessary, the wheels may be built up of several segments, in which case the segments of one disc may be staggered in respect of the segments of the other disc.

A further important advantage of this new type of chain wheel resides in the fact that it is not liable to break as cast iron chain wheels incline to do.

I claim:

1. In a device of the kind described in combination, a pair of sheet metal discs fixed to one another with their rims diverging to form a groove and bosses projecting into said grooves.

2. In a device of the kind described in combination, a pair of sheet metal discs fixed to one another with their rims diverging to form a groove and stamped bosses projecting into said groove.

3. In a device of the kind described in combination, a pair of sheet metal discs fixed to one another with their rims diverging to form a groove, bosses projecting into said groove, an indenture in the center of at least one of the two discs to secure the wheel to a shaft.

4. In a device of the kind described in combination, a shaft, a pair of sheet metal discs on said shaft, fixed to one another with their rims diverging to form a groove, bosses projecting into said groove, a space between the two discs at the indenture, a screw at the end of the shaft for resiliently pressing together the center part of the two discs, and against an abutment on said shaft.

In testimony whereof I affix my signature.

HUGO STAHL.